INVENTOR
GORDON A. TORRANCE
BY
Farley, Forster & Farley
ATTORNEYS

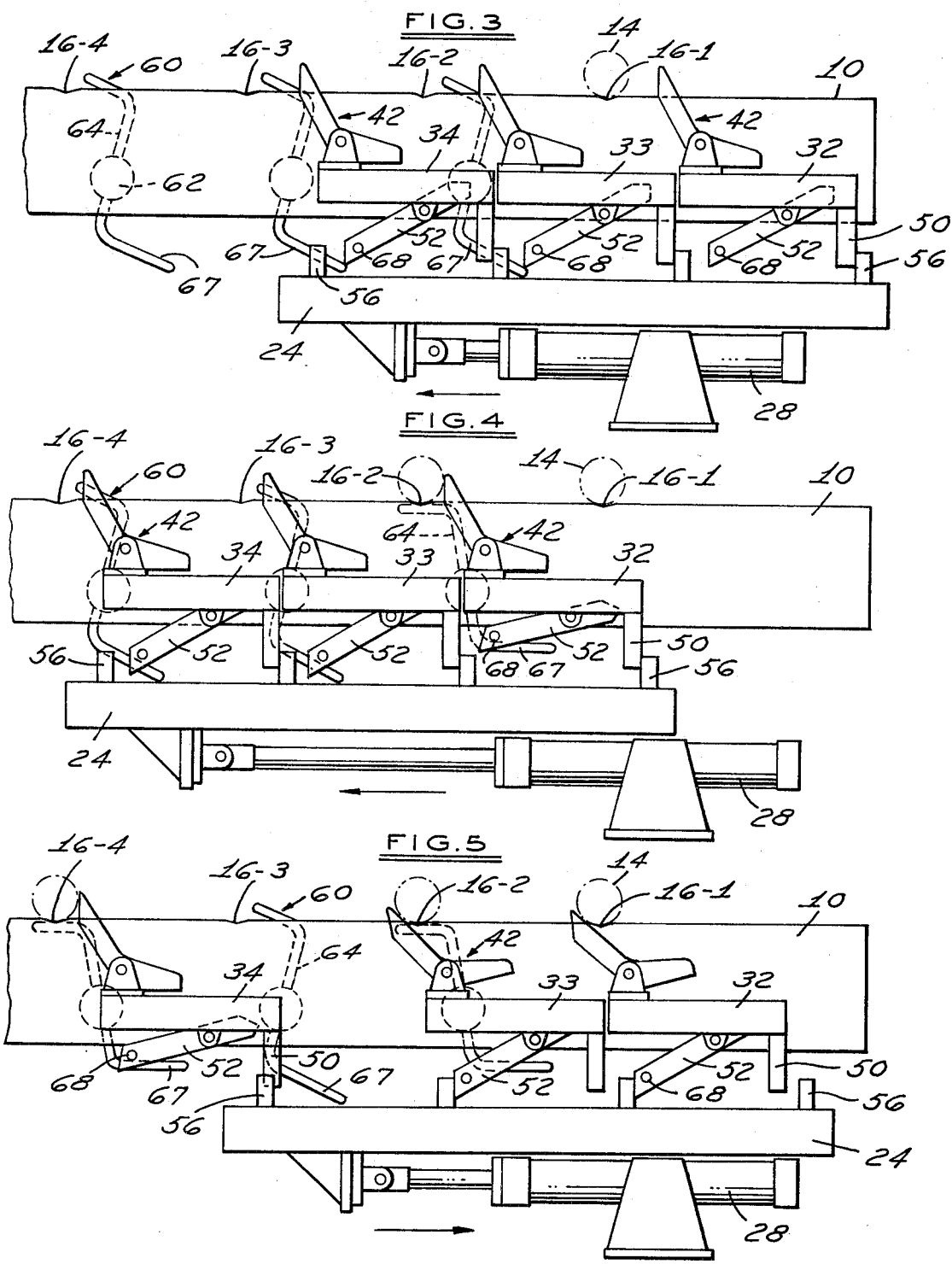

United States Patent Office 3,512,629
Patented May 19, 1970

3,512,629
ACCUMULATING TRANSFER CONVEYOR
Gordon A. Torrance, Taylor, Mich., assignor to Jervis B.
Webb Company, a corporation of Michigan
Filed May 10, 1967, Ser. No. 637,524
Int. Cl. B65g 25/10
U.S. Cl. 198—221                                14 Claims

ABSTRACT OF THE DISCLOSURE

A pusher type conveyor having a plurality of stations along a support to which objects are successively advanced by the action of one-way pushers capable of engaging and advancing the objects from one station to the next successive station on the forwarding movement of reciprocating driving mechanism. Each pusher is mounted on a separate carriage, and drive means is provided between each carriage and the driving mechanism. Control elements including sensing devices for detecting the presence of an object at the stations are operative to regulate the article advancing action of the carriages so that only pushers at stations preceding an empty station are active on each forwarding movement and the conveyor thus tends to build up and accumulate a bank of objects.

BACKGROUND OF THE INVENTION

Field of the invention

The invention pertains to an improved pusher conveyor, sometimes called a transfer conveyor, of the type employing pushers which are reciprocably driven on forwarding and return movements to advance objects from one station to a successive station along a support. The improvements regulate the forwarding action of the pushers so as to accumulate and maintain a bank of objects by activating only pushers which precede an empty station or stations anywhere along the support on each forwarding movement.

Description of the prior art

Examples of prior reciprocating pusher conveyors are given in U.S. Pats. 2,961,973 and 3,208,401, in both of which the reciprocating pushers engage driving dogs of article supporting carriages. Accumulation is provided by mechanism which causes the driving dog of a carriage to be moved to a non-driving position in the event the carriage overtakes a preceding carriage. Once the carriages have been accumulated in a bank, the conveying action ceases between the ends of the bank.

SUMMARY OF THE INVENTION

In the conveyor of the present invention, a support is provided having a plurality of stations to which objects are to be advanced and accumulated as the stations become occupied. For example, the conveyor may extend between successive work stations of a manufacturing process, the conveyor support being designed to accommodate the workpieces of the process, and the function of the conveyor is to advance workpieces between the work stations and accumulate a reserve bank of workpieces, maintaining this bank at maximum possible level considering variations in the rate at which workpieces may be placed on the conveyor at the first work station and removed from the conveyor at the next work station.

The conveying mechanism provided for accomplishing this includes a plurality of one-way pushers capable of engaging and advancing the objects or workpieces on the support, the pusher being normally reciprocated on forwarding and return movements to advance a workpiece from one position or station on the support to the next successive position or station on each forwarding movement. The workpiece forwarding action of the pushers is controlled by elements including sensing devices for detecting the presence of a workpiece at each of the conveyor stations so that only pushers at stations preceding an empty station are active on each forwarding movement. This action of the pushers is such that any empty station anywhere along the length of the conveyor support tends to be filled by an object in advance thereof; when all stations are thus occupied the conveying action ceases until an object is removed from the delivery end of the conveyor, at which time all pushers again become active and all objects on the conveyor are advanced one station; likewise, if there is an empty station between the ends of the conveyor all pushers in advance thereof will remain active.

The conveyor thus acts to accumulate and maintain the reserve bank of workpieces to the maximum degree at the downstream portion of the conveyor.

Other features and advantages of the invention can be best understood from the following description of the embodiment thereof shown in the accompanying drawings.

BRIEF DESCRIPTION OF THE DRAWINGS

The drawings comprise the following views:

FIG. 3 is a schematic side elevation showing the conveyor at the beginning of a forwarding movement;

FIG. 4 is a schematic elevation similar to FIG. 3 showing the structure at the end of a forwarding movement; and FIG. 5 is a side elevation similar to FIG 3 illustrating the selective pusher operation of the conveyor on a return movement.

DESCRIPTION OF THE PREFERRED EMBODIMENT

Figure 1:
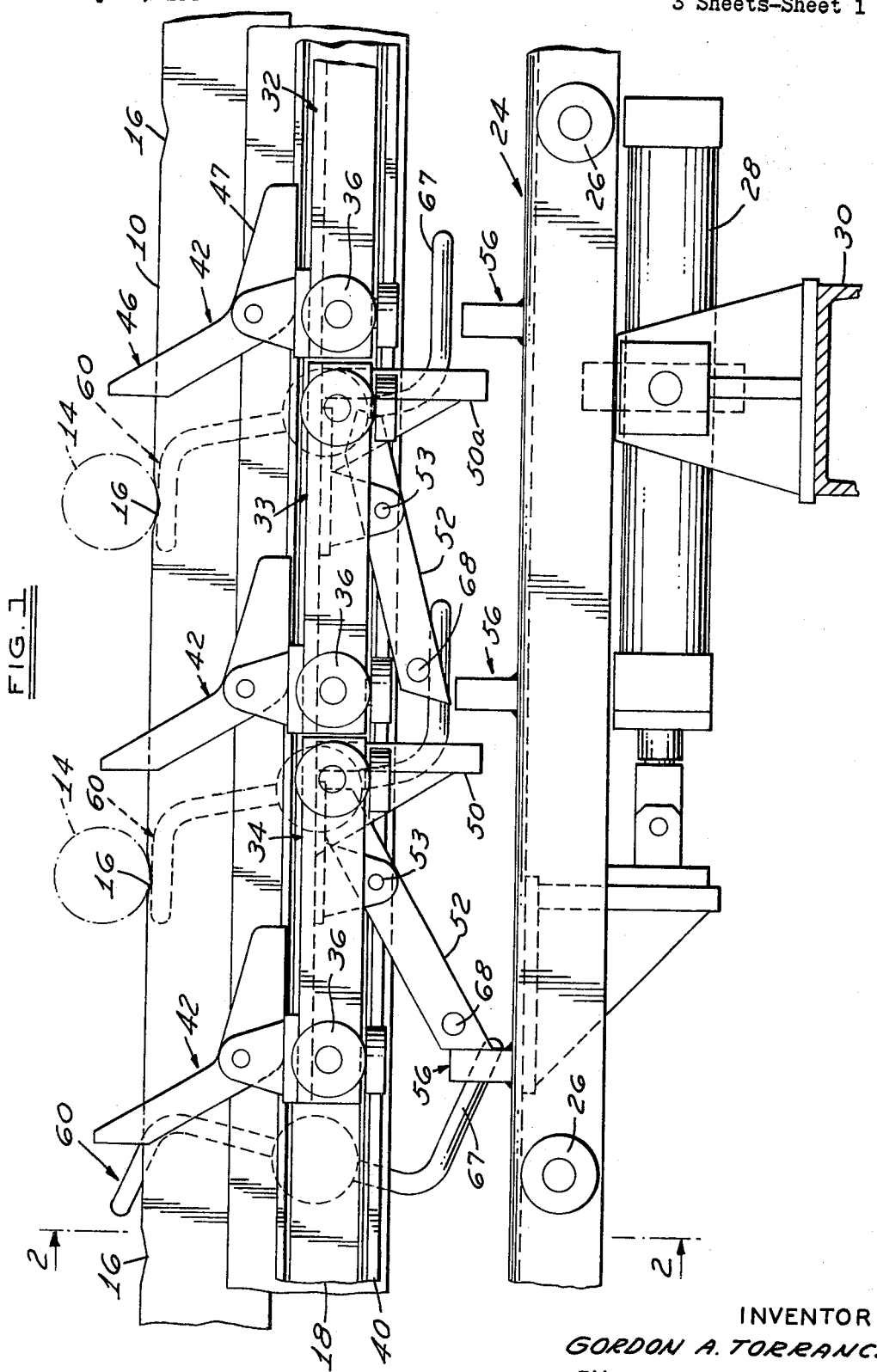
FIG. 1 is a sectional elevation of a portion of a conveyor constructed in accordance with the invention, taken substantially as indicated by the line 1—1 of FIG. 2, the supporting structure at one side thereof being removed for the sake of clarity.

Only the essential portions of the construction have been shown in the drawings, it being understood that a conveyor of the present invention would be manufactured in any length desired, and that an increase in length would merely involve the use of additional numbers of the operating parts illustrated and to be described.

Figure 2:
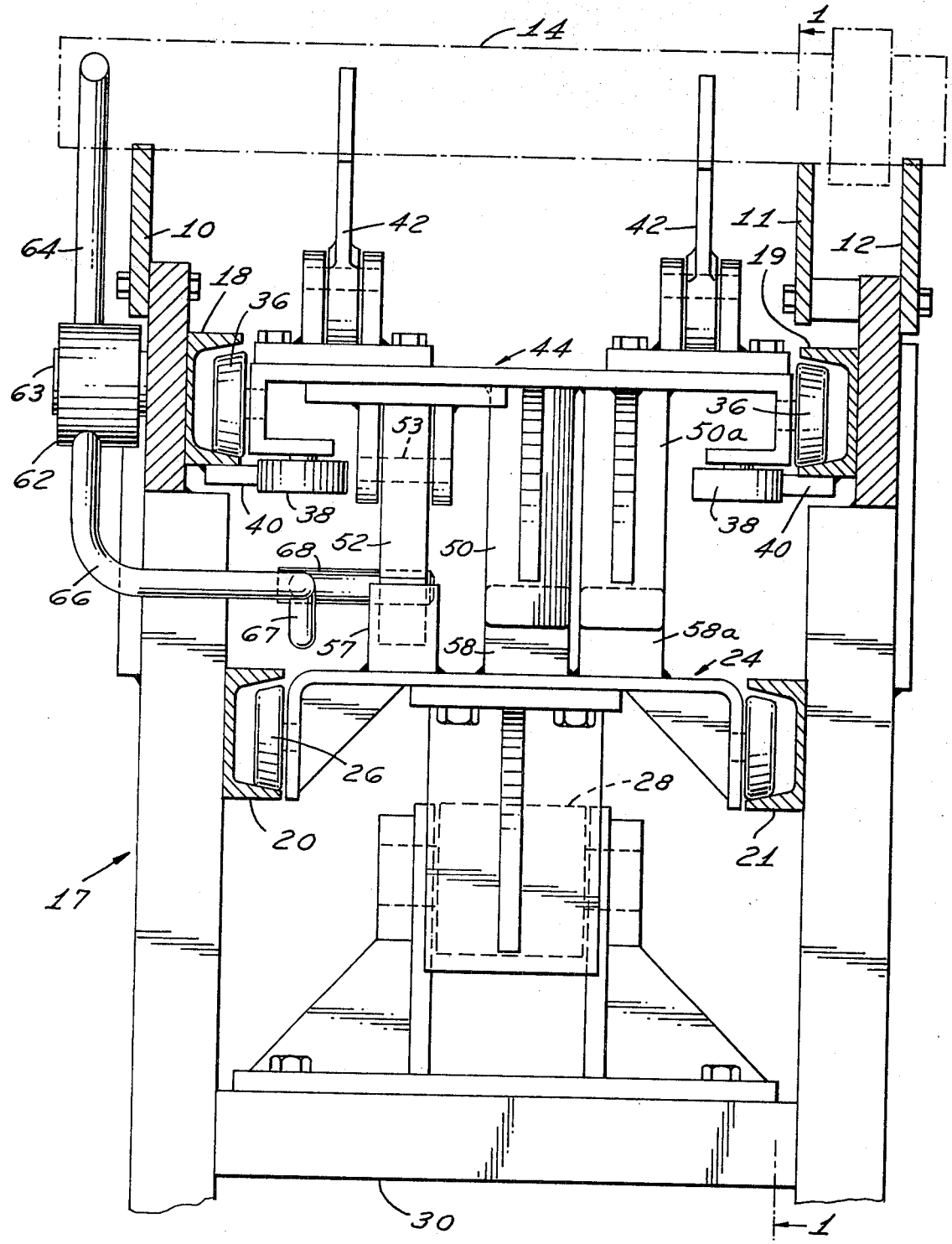
FIG. 2 is a transverse sectional elevation of the structure, taken on the line 2—2 of FIG. 1.

Referring to FIGS. 1 and 2, the conveyor structure includes a support in the form of parallel bars or rails 10, 11 and 12 on which the objects to be conveyed, such as workpieces 14, are placed for sliding or rolling movement. Bars 11 and 12 both support and guide the workpieces 14. Stations, as defined by notches 16 in the support bars, are provided at evenly spaced intervals along the length thereof.

Suitable frame structure 17 is provided on which the support bars 10–12 are mounted together with an upper pair of track members 18 and 19 (FIG. 2) and a lower pair of track members 20 and 21.

A driving member or carriage 24, equipped with wheels 26, rides on the lower track members 20 and 21 and is connected to suitable reciprocating driving means such as the fluid pressure cylinder 28 mounted on a cross member 30 of the frame structure 17.

A plurality of separate carriages are mounted on the upper track members 18 and 19, there being one less carriage than the number of stations 16 along the length of the support. Thus in the construction shown there are four stations 16 along the support bars and three carriages 32, 33 and 34 are employed.

Each carriage includes supporting wheels 36 engaging the track members 18 and 19, guide wheels 38 engaging guide rails 40 and a pair of one-way object engaging pushers 42 pivotally mounted on the upper surface of the C-shaped carriage frame 44. Each pusher 42 has a normally upstanding driving portion 46 urged to the position shown by a counterweighted tail portion 47.

Driving means for imparting forwarding and return movements to the carriages 32–34 includes a forwarding drive dog 50 and a return drive dog 52 on each of the carriages, the forwarding dog 50 being fixed and the return dog 52 being mounted on a pivot 53. The forwarding drive dogs 50 of adjacent carriages are transversely offset as shown in FIG. 2 where the reference 50 designates the forwarding drive dog of carriage 34 and the reference 50a the corresponding part of the next carriage 33. Pairs of driving abutments are secured to the driving carriage 24 at spaced intervals along the length thereof, and each pair of abutments are mounted in transverse alignment and are generally designated by the reference 56 in FIG. 1. Referring to FIG. 2, it can be seen that the transverse spacing of each pair of abutments is such that one element 57 thereof is transversely aligned with the return dog 52 of one carriage, while the other element 58 thereof is aligned for engagement with the forwarding dog 50 of the next adjacent carriage in the direction of forwarding movement. Thus as shown in FIG. 2, the elements 58 and 58a of adjacent pairs of abutments 56 are aligned with the forwarding drive dogs 50 and 50a of adjacent carriages.

This driving arrangement is normally operative to impart forwarding and return movements to all carriages in unison, forwarding movement being imparted to the carriages through the engagement of driving elements 58 and 58a with the respective forwarding drive dogs 50 and 50a of alternate carriages; and return movement being imparted by the engagment of drive elements 57 on the drive member 24 with the return drive dogs 52 of the carriages.

Pusher controlling means are provided for selectively activating only those pushers which precede an empty station or stations 16 along the support. A sensing device 60 is mounted on the conveyor structure 17 adjacent each of the stations 16 to which an object is advanced (no sensing device being necessary at the initial or receiving station of the conveyor) for detecting the presence of an object or workpiece 14 at each such station. Each sensing device, as best shown in FIG. 2, includes a hub 62 mounted on a pivot 63 and having an upwardly extending sensing member or arm 64 adapted to be engaged by a workpiece. A counterbalancing control arm 66 is also secured to the hub 62 and extends downwardly and inwardly, terminating in a portion 67 which lies in the path of travel of a laterally projecting control pin 68 secured to each of the return drive dogs 52 of the carriages.

Operation of the conveyor is illustrated in FIGS. 3–5. The first four stations of a conveyor are included in these views and have been designated 16–1, 16–2, etc. As previously mentioned, any additional number of stations desired can be added by increasing the length of the conveyor, the length of the driving member 24, and adding one pusher carriage for each additional station.

In FIG. 3 the driving member 24 and carriages 32–34 are shown at the beginning of a forwarding motion, and one workpiece 14 has been placed on the first or receiving station 16–1. When a forwarding stroke is imparted to the driving member 24 by the fluid pressure cylinder assembly 28, the driving elements 58 and 58a of the driving member 24 engage the respective forwarding drive dogs 50 and 50a of the carriages and all carriages are advanced in unison to the position shown in FIG. 4, advancing the workpiece 14 to station 16–2. During this forwarding movement the control pin 68 on the return drive dogs 52 of each of the carriages 33 and 34 rides up and over the control arm 67 of the sensing device 60 at stations 16–2 and 16–3; and, when the workpiece 14 approaches station 16–2, the sensing arm 64 of the control device at station 16–2 is engaged by the workpiece causing the control device to pivot to the position shown in FIG. 4. Such pivotal movement of the sensing device causes the control arm 67 thereof to engage the control pin 68 on the return dog 52 of carriage 32, and raises the return dog 52 of carriage 32 to a non-driving position relative to the return drive element 57. Since no workpiece is present at stations 16–3 and 16–4, this disengaging action of the return drive dog does not take place with respect to carriages 33 and 34 and on the next return stroke of the drive member the return drive dogs 52 of each of these carriages will be engaged by their respective drive element 57 on the drive member 24. Carriage 33 will abut and impart return movement to carriage 32.

This operation will be repeated on successive forwarding and return strokes of the drive member 24 and assuming that a workpiece is placed on the conveyor between successive forwarding strokes, as each station is progressively filled the carriage which feeds that station will have its return drive dog 52 disabled. But as long as no workpiece is detected at a following station—in other words, as long as the return dog of a down-stream carriage is not disabled by the presence of a workpiece, then such down-stream carriage will push all preceding carriages back to forwarding position. When all stations are full, the return dog 52 of all carriages will be disabled and motion of all carriages will cease until a workpiece is removed.

This action of the pusher controlling means is further illustrated in FIG. 5 which shows the driving carriage 24 approaching the end of a return stroke. In this view, station 16–3 is empty; station 16–4 is occupied by a workpiece 14, and it is assumed that any other stations (not shown) down-stream from station 16–4 are also occupied. On the forwarding motion which immediately preceded the return motion illustrated, the workpiece was advanced to station 16–4, a workpiece was advanced to station 16–2 and a workpiece has been placed on the support at station 16–1. Station 16–3 is empty as a result, for example, of an interruption in the supply of workpieces to the conveyor.

When carriage 34 delivered the workpiece 14 to station 16–4 on the immediately preceding forwarding motion, the return drive dog 52 of carriage 34 was disabled or moved to non-driving position by the control arm 67 of the sensing device at station 16–4 and is held thereby in the position shown. Thus, no drive was imparted to the carriage 34 on the return movement of the drive carriage 24, and carriage 34 remains stationary. Since no workpiece was advanced to station 16–3, the return drive dog 52 of carriage 33 was not disabled. Return movement has been imparted to carriage 33 by the drive member 24, and carriage 33 then abutted and imparted return movement to carriage 32. On the next forwarding movement of the drive member 24, all pushers in advance of the empty station 16–3 will be active.

In summary, and irrespective of the number of stations along the support, the conveying action of the pushers advances an object to the last or discharge station on the support as long as that station is empty. When the last station is occupied, the conveyor tends to build up or accumulate a bank of objects at stations successively preceding the last station and to advance all objects in the bank each time an object is removed from the last station. Thus a reserve bank is accumulated during periods when the rate at which objects are supplied to the conveyor exceeds the rate at which they are removed there-from, the bank being advanced and depleted during periods when the demand exceeds the supply of objects. Likewise the conveyor acts to rebuild the bank by filling in any empty stations when the supply of objects permits, as illustrated in FIG. 5.

While preferred embodiments have been described above in detail, it will be understood that numerous modifications might be resorted to.

I claim:

1. A pusher conveyor having a plurality of supporting stations to which objects are advanced, conveying mechanism reciprocable on forwarding and return strokes to engage and advance objects one station on each forwarding stroke, and means for reciprocating the conveying mechanism, characterized by:

sensing devices at each of the stations for detecting the presence of an object, the conveying mechanism including a plurality of one-way pushers each capable of engaging and advancing an object on the forwarding stroke, and pusher control means operated by the sensing devices for permitting return stroke movement of only pushers at stations which precede an empty station.

2. A pusher conveyor as claimed in claim 1 wherein the sensing devices comprise a plurality of sensing members, each sensing member being pivotally mounted on the support adjacent one of the stations, each sensing member having one portion engageable by an object at such station and a second portion operatively associated with the pusher control means.

3. A pusher conveyor as claimed in claim 2 wherein the pusher control means includes a plurality of members each associated with one of the pushers for returning such pusher to article engaging and advancing position on the return stroke of the conveying mechanism.

4. A pusher conveyor as claimed in claim 3 wherein each sensing member disables a pusher return member in response to the presence of an object at the station of such sensing member.

5. A pusher conveyor as claimed in claim 1 wherein the conveying mechanism includes a plurality of separate carriages, each carriage supporting one of the pushers, a carriage supporting track on which the carriages are mounted in end-to-end relation, a separately supported reciprocating driving member, and driving means on the driving member and carriages for normally imparting forwarding and return movement to the carriages.

6. A pushed conveyor as claimed in claim 5 wherein the pusher control means disconnects said driving means for imparting return movement to a carriage in response to the presence of an object at the station to which an object would normally be advanced by such carriage, and each carriage whose return movement driving means is not so disconnected being capable of pushing all preceding carriages whereby all carriages which precede an empty station are returned to article engaging and advancing position on each return stroke of the driving member.

7. A pusher conveyor as claimed in claim 6 wherein the driving means between the driving member and each of the carriages includes a driving abutment on the driving member, a return drive dog on each carriage movable between driving and non-driving positions, the return drive dog forming part of the pusher control means and being movable to non-driving position in response to the presence of an object detected by the sensing device at the advance station normally served by such carriage.

8. A pusher conveyor as claimed in claim 1 wherein the pusher control means for each pusher includes a member normally operable on the return stroke of the conveying mechanism to return said pusher to article engaging and advancing position.

9. A pusher conveyor as claimed in claim 8 wherein the sensing devices comprise a plurality of sensing members each movably mounted adjacent one of the stations, and means normally biasing each sensing member to a position for engagement by an object.

10. In a pusher conveyor having a supporting framework and a plurality of stations therealong to which objects are successively advanced and accumulated, the improvement comprising:

a plurality of carriages each having object engaging means mounted thereon;

track structure supporting the carriages in end-to-end relation;

a driving member mounted for reciprocating movement adjacent to the carriages;

drive means between the drive member and each of the carriages for imparting forwarding and return movements to the carriages upon reciprocating movement of the drive member;

and control means including sensing devices for detecting the presence of an object at each of the stations operative to cause the drive means to return to forwarding position only such carriages which precede an empty station.

11. A pusher conveyor as claimed in claim 10 wherein the control means includes means for disconnecting the drive means for imparting return movement to each of the carriages in response to the presence of an object detected by a sensing device at the advance station normally served by such carriage.

12. A pusher conveyor as claimed in claim 11 wherein any carriage not disconnected from the drive means for imparting return movement thereto is capable of pushing any preceding disconnected carriage and imparting return movement thereto.

13. A pusher conveyor as claimed in claim 12 wherein each carriage is provided with a return drive dog movable from driving to non-driving position by said drive disconnecting means.

14. A pusher conveyor as claimed in claim 13 wherein the sensing devices each consist of a movable sensing member mounted on the support adjacent one of the stations, the sensing member having one arm extending into the path of movement of an object and a control arm extending into the path of movement of the return dog of a carriage, the sensing member being movable upon engagement by an object to cause displacement of the return dog to non-driving position by the control arm of the sensing member.

References Cited

UNITED STATES PATENTS

| 2,961,973 | 11/1960 | Bozman | 104—162 |
| 2,897,769 | 8/1959 | Bishop | 104—88 |
| 3,286,652 | 11/1966 | Ringwood | 104—147 |

RICHARD E. AEGERTER, Primary Examiner